March 25, 1941.    E. M. MATTHEWS    2,235,896

COMMUNICATION CABLE APPARATUS MOUNTING

Filed April 22, 1939

INVENTOR
E. M. MATTHEWS
BY
J. W. Schmied
ATTORNEY

Patented Mar. 25, 1941

2,235,896

UNITED STATES PATENT OFFICE 2,235,896

COMMUNICATION CABLE APPARATUS MOUNTING

Edgar M. Matthews, Jamaica, N. Y., assignor to Bell Telephone Laboratories, Incorporated, New York, N. Y., a corporation of New York Application April 22, 1939, Serial No. 269,508

7 Claims. (Cl. 178—46)

This invention relates to cables used in the electrical industry and more particularly to cables used in the communications industry, wherein it is necessary to add apparatus units such as lumped inductance or capacitance or, under some circumstances, resistance for loading, balancing or building out or other purposes, and where the spacing of said units with reference to said conductors in a plane at right angles to the conductor lengths is of importance.

This invention is shown as applied to the newly adapted, substantially gas insulated cables, wherein the individual conductors are spaced from each other in the gaseous medium within the cable sheath by a thin flat disc insulator. Specifically, it is shown as applied to a cable consisting of two pairs of conductors known in the art as a quad. It is to be understood that the invention is not so limited. It may be applied to cables comprising any number of pairs from a single pair upwards, and it may be applied to cables of other types.

An object of the invention is to provide means within a cable so that it is possible to interconnect the cable conductors and the required added apparatus units with a minimum amount of unbalance and interference caused by said interconnections.

A further object of the invention is to provide an inexpensive and convenient conductor spacer which can also be used to mount apparatus units within an electric cable.

A further object of the invention is to so arrange the cable and its conductors that the required apparatus may be located at an electrically neutral point with reference to the conductors involved.

A further object of the invention is to provide a unitary insulator, spacer, and apparatus mounting for use within an electric cable.

A further object of the invention is to reduce the lengths of the leads required to interconnect the cable conductors and the added apparatus.

A feature of the invention is a thin flat disc insulator arranged to mount apparatus within a cable.

A further feature of the invention is a device for maintaining the proper space relationship between conductor pairs and between said pairs and an apparatus unit within an electric cable, which device serves also as a mounting for the apparatus unit.

A further feature of the invention is the mounting of the required apparatus unit or units in the center of the space separating the conductors to which the units are connected.

These and other objects and features will become apparent from the description and claims hereunder when read in connection with the associated drawing in which—

Fig. 1 is a perspective view illustrative of the invention, showing a cable from which a section of lead sheath together with the shielding material has been stripped. The four conductors have been severed and spread while maintaining their proper relationship. Enlarged disc insulators, which serve also as conductor spacers and mountings for small apparatus units mounted at the neutral point with respect to said conductors have been slipped onto the conductors by means of holes in said discs. The apparatus units are interconnected as necessary to the conductor pairs. The assembly is thereafter covered with a metal sleeve. Figs. 2, 3, 4 and 5 show practical details for mounting and connecting small apparatus units in a carrier cable.

Fig. 1 illustrates the principle of the invention. The sheath and shielding, if there be any shielding, over a section of cable is stripped off as between 25 and 25'. A four-conductor quad, consisting of two pairs of conductors, is shown extending from the cable butt at 25 to the left of the figure. In section the four conductors are disposed at the corners of a square. The conductors at diagonally opposite corners of the square form a pair. Thus conductors 2 and 4 form one pair and conductors 1 and 3 form a second pair. The proper relationship of the conductors and pairs with respect to each other within the cable is maintained by insulator discs such as 6, which disc is pierced with four holes 12, 13, 14 and 15 arranged in the form of a square. The four conductors are severed so that the discs such as 7 and 8 may be slid onto them. For purposes of clarity conductors 2 and 4 are shown terminated near the butt 25 and conductors 1 and 3 are shown extending through holes 12 and 14 in insulator disc 6 toward the right of Fig. 1.

The thin flat insulating and mounting discs 7 and 8 are larger than disc 6 and serve as insulators and spacers, and also for mounting the various small apparatus units for series inductance, building-out capacitance, balancing capacitance, combinations of series inductance and building-out capacitance, or for resistance units as may be required. It is to be understood that Fig. 1 is intended only to illustrate the principle of the invention and is not intended to show the practical details of mounting which are illustrated in the other figures herein.

Three apparatus units, 9, 10 and 11, are shown. Unit 9 is indicated as being supported by disc 7 and units 10 and 11 by disc 8. The means of securing these units to said discs in a practical assembly are more fully disclosed in Figs. 2 to 5 herein and in the description below.

In disc 7 four holes, 16, 18, 28 and 29, and in disc 8 four holes, 20, 22, 36 and 37, are indicated to accommodate the four conductors of the quad. Conductors 1 and 3 are shown extending through holes 28 and 29 in disc 7 and through holes 36 and 37 in disc 8, and are terminated at 26 and 27, respectively, adjacent the right-hand surface of disc 8.

In disc 8 there are shown two additional holes 23 and 24, which accommodate short terminal leads which may be required for connection between an apparatus unit mounted on the left of disc 8 and conductors or apparatus to the right of said disc. The four quad conductors at the right of Fig. 1 are numbered 1′, 2′, 3′ and 4′. Conductors 1′ and 3′ are terminated at 19 and 21, respectively, to the right of the terminations 26 and 27 of conductors 1 and 3, respectively. Conductors 2′ and 4′ are shown broken. It is to be understood that normally they are spliced by means of details, not shown, to conductors 2 and 4 directly or through apparatus units as required. The number of discs similar to 7 and 8 which are used may be any number required to mount the apparatus units which may be needed.

Insulating discs 7 and 8 are indicated as having four drilled or punched round holes between their two opposite surfaces to accommodate four conductors. In many cases, such as when the apparatus units which are required are connected in shunt with the conductors, it may not be necessary to sever the conductors. In such cases it is preferable to use insulators which are notched rather than drilled to accommodate the conductors. An insulator 30 arranged with notches is shown at the right of the figure. When notched insulating and mounting discs, such as 30, are used, the conductors may be pressed into the notches. The width of the notches is made just slightly less than the diameter of the conductors except for the generally circular portion at the end of the notch which is preferably of slightly larger diameter than that of the conductors which they accommodate. The notch may have a wide variety of shapes. The shape of the four notches 31, 32, 33 and 34, shown in insulating discs 30, has been found generally satisfactory for the purpose. Hole 35 is drilled or punched in disc 30 for use in mounting apparatus units. Holes 38 and 39 are intended to accommodate mounting screws or details as described more fully hereunder.

The apparatus units may be connected temporarily until electrical measurements and adjustments in the values of the units are completed. Some flexibility in positioning the discs and the units mounted thereon is achieved through sliding the discs along the conductors. When the arrangements and adjustments are completed, the discs and units are permanently fastened, any shielding which may be required is applied to the assembly, and the whole is covered with a sleeve 5 in substantially the same manner as in an ordinary splice for paper insulated cable.

Fig. 2 shows a practical method of mounting an apparatus unit 201 between two disc insulator mountings 202 and 203, using two screws 204 and four hollow metal screw details 205. The mountings are tapped to accommodate the screw details and clear-drilled for the mounting screws. The apparatus units are tapped for the mounting screws. The units are mounted by means of the mounting screws as indicated. The hollow metal screw details are screwed into the tapped holes in the mounting disc and the mounting assembly is slid along the conductors. The apparatus terminals are wound around the hollow metal screw details and the conductors. After the final position and the necessary electrical constants of the apparatus unit have been determined, the terminals are permanently soldered to the conductors.

Fig. 3 shows a practical method of mounting two apparatus units using three disc insulator mountings. Two screws, such as 204, are used in the two end mountings and a headless threaded detail 301 is used for securing the two apparatus units to the center mounting. Two round holes 302 and 303, similar to 23 and 24 as described above, are drilled or punched in the center mounting through which the terminals of the right-hand apparatus unit may be drawn to connect to the apparatus terminals and conductor to the left of the center mounting.

Figure 1:
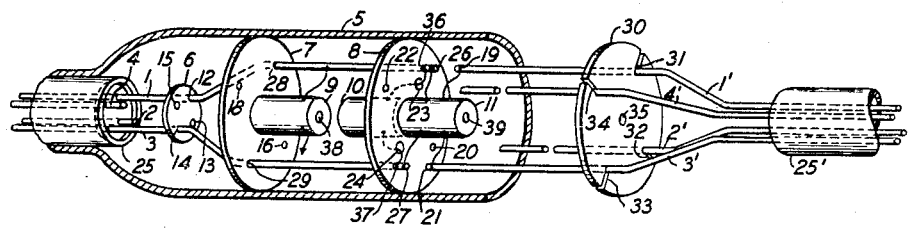
Figure 2:
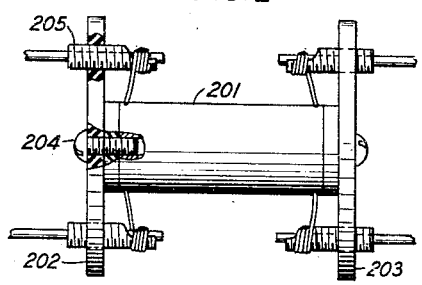
Figure 5:
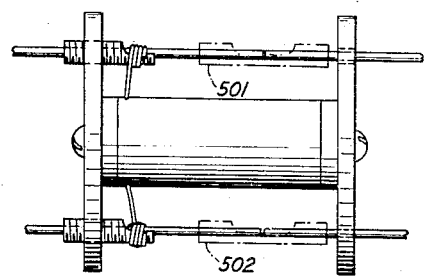
Fig. 5 shows an arrangement for securing one apparatus unit between two disc insulator mountings and features two splicing details 501 and 502 which are used to facilitate splicing the conductors which have been severed. A joint is indicated in each conductor about the middle of each splicing detail.
Figure 3:
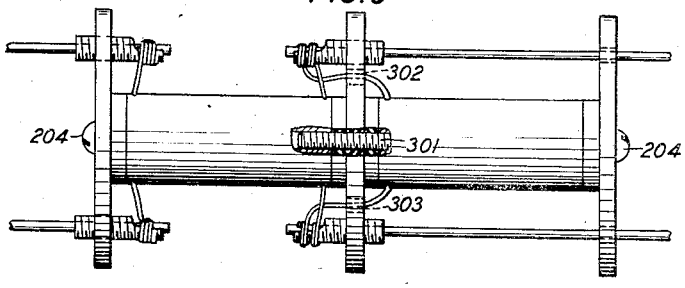
Figure 4:
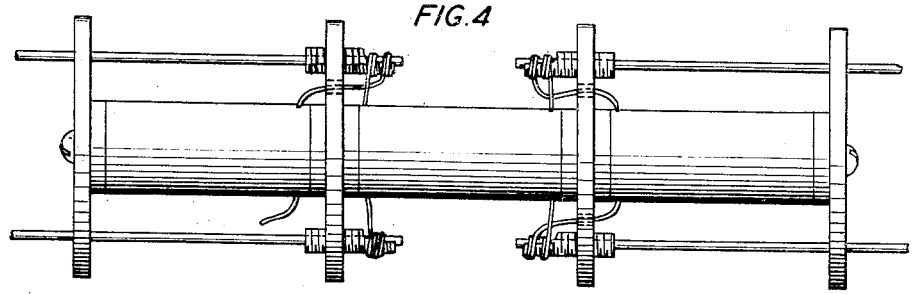
Fig. 4 shows an arrangement wherein three apparatus units are secured in position by means of four disc insulator mountings. For this arrangement, two headless threaded screws 301 are used to secure the three units to the two middle mountings.

It will be observed that by means of the mounting arrangements shown, it is possible to maintain the conductors forming each pair of a quad in their proper positions in relation to each other, namely, each of the individual conductors forming a pair of conductors as viewed in cross-section are at the diagonally opposite corners of a square. Further, it may be observed that each apparatus unit is mounted so that its longitudinal axis is along the line forming the center of said square which is the neutral axis of the quad. Further, it is possible to slide the apparatus assembly along said axis until its proper position is determined before it need be permanently connected.

In the delicate task of properly loading, balancing and building out carrier circuits where the adjustments are necessarily fine, the above features are of special importance.

What is claimed is:

1. In a communication cable, a plurality of conductors enclosed within a common sheath, a unitary insulator enclosed also within said sheath, for insulating and spacing said conductors each with relation to the other, and means in said insulator for mounting electrical apparatus.

2. In an electric cable, a single, continuous tube enclosing a plurality of electrical conductors, a disc-shaped insulator within said tube, means in said insulator for securing said conductors in spaced relationship within said tube, and means also in said insulator for mounting electrical apparatus units such as a lumped inductance, resistance or capacitance at the neutral electrical point with respect to said conductors.

3. In an electric cable, a single, continuous tube enclosing a conductor and a unitary disc insulator, means in said insulator for fixing the position of said conductor within said tube, and means also in said insulator for mounting an electrical apparatus unit such as a lumped inductance, resistance or capacitance.

4. In an electric communication cable, a single continuous tube enclosing a unitary insulator, a conductor and an electrical apparatus unit such as a lumped inductance, resistance or capacitance, means in said insulator for fixing the position in space of said conductor within said tube, and means also in said insulator for fixing the position in space within said tube of said unit relative to said conductor.

5. In an electrical communication cable, a conductor, a sheath surrounding said conductor, a section of said sheath being removed, a disc insulator having an opening therein between the opposite flat surfaces thereof, said conductor threading said opening, an apparatus unit such as a lumped inductance, resistance or capacitance mounted on said insulator, and a sleeve enclosing said conductor insulator and unit.

6. In an electrical communication cable, a first and a second pair of conductors and a disc insulator all enclosed within a single common tubular covering, means in said insulator for spacing said conductors each with relation to the other, and an apparatus unit, such as a lumped resistance, capacitance or inductance, mounted on said insulator.

7. In combination in a communication cable, a plurality of conductors, a first unitary disc insulator, a unitary sheath enclosing said plurality of conductors and insulator, a plurality of channels through said insulator substantially in parallel with the longitudinal axis of said cable, said conductors threading said channels individually, a section in said sheath of relatively substantially enlarged cross-section, a second insulator of relatively proportionally enlarged cross-section in said enlarged section, a plurality of channels through said second insulator, said conductors threading said channels also, and means in said second insulator for mounting an apparatus unit.

EDGAR M. MATTHEWS.